May 30, 1967     C. F. LE MMON     3,322,439
TRACTOR-TRAILER STEERING COMBINATION
Filed Oct. 4, 1965     2 Sheets-Sheet 1
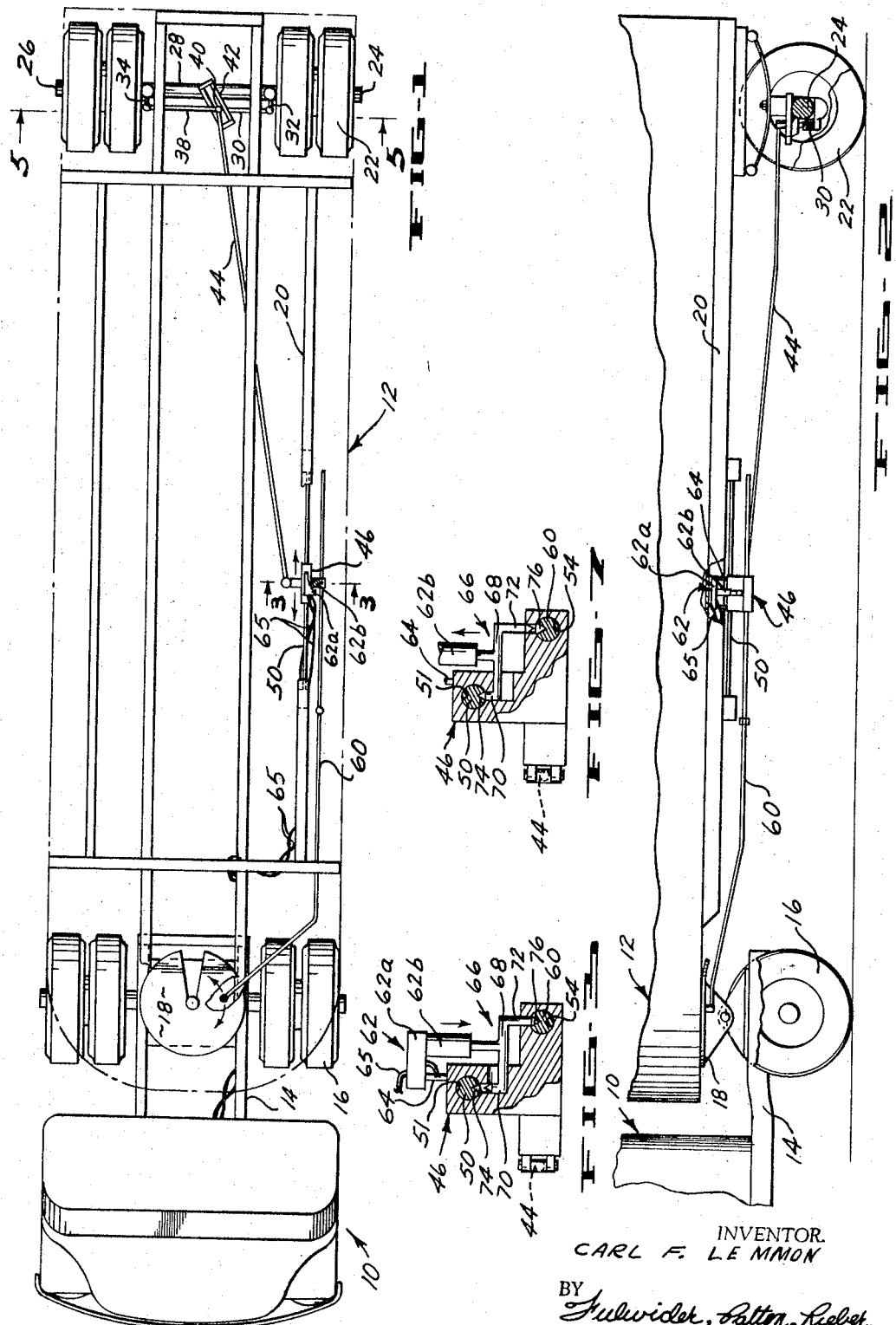
INVENTOR.
CARL F. LEMMON
BY
Fulwider, Patton, Rieber,
Lee & Utecht
ATTORNEYS May 30, 1967  C. F. LE MMON  3,322,439
TRACTOR-TRAILER STEERING COMBINATION
Filed Oct. 4, 1965  2 Sheets-Sheet 2
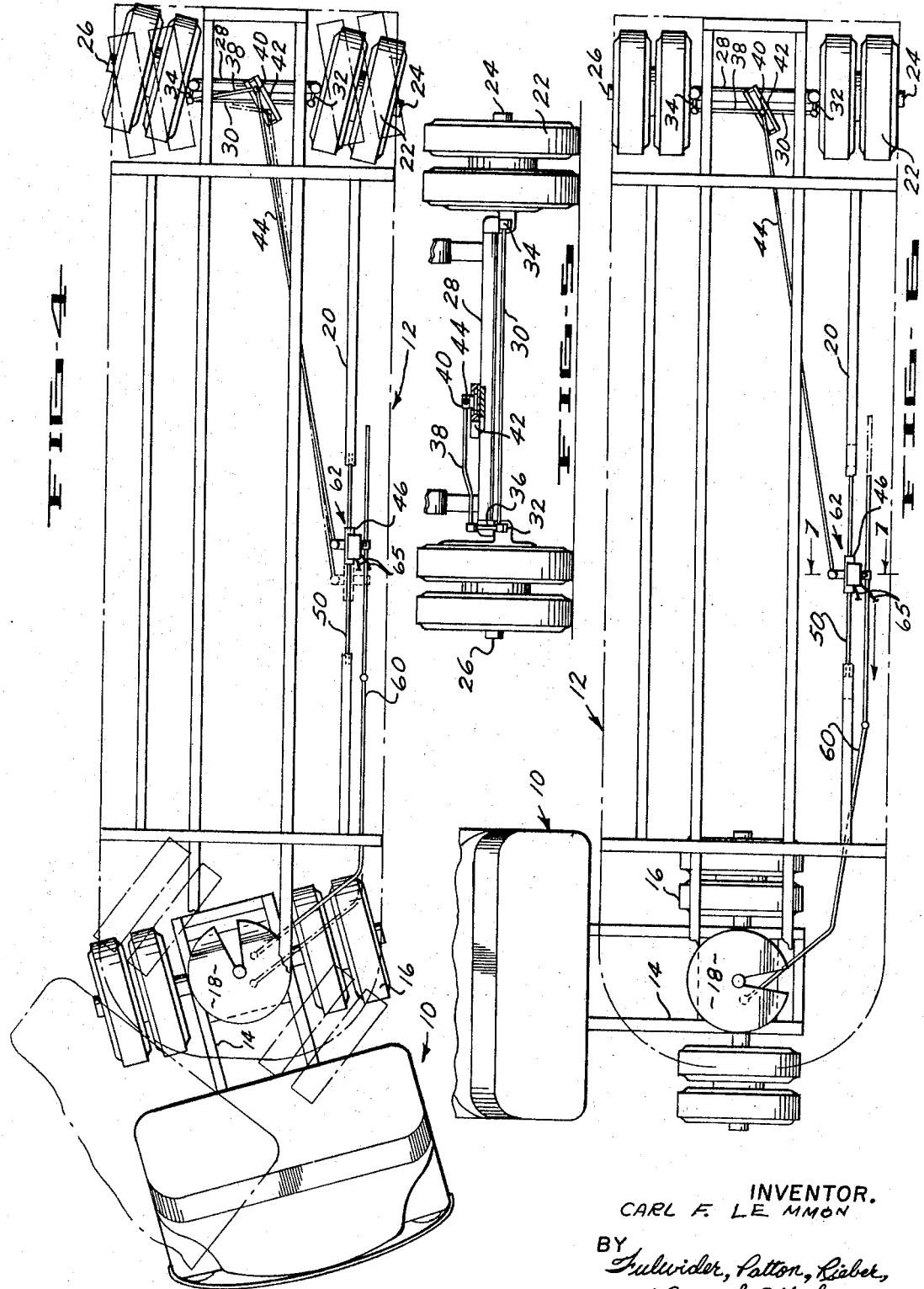
INVENTOR.
CARL F. LE MMON
BY
Fulwider, Patton, Rieber,
Lee & Utecht
ATTORNEYS United States Patent Office  3,322,439
Patented May 30, 1967

3,322,439
TRACTOR-TRAILER STEERING COMBINATION
Carl F. Le Mmon, Long Beach, Calif., assignor of one-half to Andrew M. Le Mmon, Pacoima, Calif.
Filed Oct. 4, 1965, Ser. No. 492,729
6 Claims. (Cl. 280—426)

The present invention relates generally to automotive vehicles and more particularly to the steering of a tractor-trailer.

It is a major object of the present invention to provide a tractor-trailer steering combination wherein the trailer wheels will be automatically steered so as to track the tractor as the latter is turned.

Another object of the present invention is to provide a tractor-trailer steering combination of the aforedescribed nature wherein the trailer wheels may be locked against steering movement during reverse operation of the tractor-trailer so as to enhance the maneuvering operation of the trailer and thereby permit the trailer to be accurately backed into a small space.

Yet a further object of the present invention is to provide a tractor-trailer steering combination of the aforedescribed nature that is simple in design and foolproof in operation whereby it may afford a long and trouble-free service life.

It is yet another object of the present invention to provide a tractor-trailer steering combination of the aforedescribed nature which employs but few operating parts and may be manufactured and installed at a comparatively low cost.

An additional object of the present invention is to provide a tractor-trailer steering combination of the aforedescribed nature wherein skidding or dragging of the trailer wheels across the pavement during sharp turns is minimized.

A yet further object of the present invention is to provide a tractor-trailer steering combination of the aforedescribed nature wherein the steering of the trailer wheels is stable and is not adversely affected by vibration.

These and other objects and advantages of the present invention will become apparent from the following detailed description of a preferred embodiment thereof, when taken in conjunction with the appended drawings wherein:

FIGURE 1 is a diagrammatic top plan view of an illustrative tractor and trailer embodying the present invention;

FIGURE 2 is a broken side elevational view of said tractor-trailer;

FIGURE 3 is a vertical sectional view taken in enlarged scale along line 3—3 of FIGURE 2;

FIGURE 4 is a top plan view similar to FIGURE 1 but showing the manner in which the trailer wheels are steered during a turn;

FIGURE 5 is a vertical sectional view taken in enlarged scale along line 5—5 of FIGURE 1;

FIGURE 6 is a top plan view similar to FIGURES 1 and 4 showing the tractor-trailer unit during a backing operation; and FIGURE 7 is a vertical sectional view taken in enlarged scale along line 7—7 of FIGURE 6.

Referring to the drawings, there is shown a tractor or power unit, generally designated 10, and a trailer unit, generally designated 12. The tractor 10 includes a frame 14 having ground-engaging driving wheels 16 at its rear portion and a conventional fifth wheel unit 18. The fifth wheel unit 18 is pivotally connected to the front of the frame 20 of the trailer 12 in a conventional manner.

The rear portion of the trailer 12 is provided with the usual ground-engaging wheels 22.

The trailer wheels 22 are supported by a pair of axles 24 and 26, the axle 24 being disposed at the left-hand side of the trailer frame 20 and the axle 26 being disposed at the right-hand side thereof. The inner ends of the axles 24 and 26 are supported for vertical pivotal movement at the opposite ends of a frame crosspiece 28, as indicated particularly in FIGURE 5. With continued reference to FIGURE 5, the inner portions of the axles 24 and 26 are interconnected by a transverse tie rod 30, the opposite ends of which are pivotally connected to the front ends of a pair of rod elements 32 and 34. The rear ends of the rod elements 32 and 34 are rigidly affixed to the inner ends of the axles 24 and 26 so that these rod elements and the tie rod 30 provide a parallelogram linkage between the axles 24 and 26 whereby they will undergo concurrent steering movement in the manner indicated particularly in FIGURE 4.

The left end of the tie rod 30 with reference to FIGURE 5 is pivotally affixed to an upstanding rod element 36. The upper end of this upstanding rod element 36 is pivotally connected to the left-hand side of a connector rod 38. The connector rod 38 extends towards the center line of the trailer frame 20 and its right hand end is pivotally connected to a block 40. The block 40 is slidably disposed within a diagonally extending support 42 that is rigidly secured to the upper portion of frame crosspiece 28. The upper portion of the block 40 is also pivotally connected to the rear end of a force-transfer element such as a rod 44. The front end of the rod 44 is pivotally connected to a slider member generally designated 46 that is longitudinally slidably supported by a longitudinally extending supported horizontal rod 50 suspended from the intermediate portion of the left side of the trailer frame 20, as shown particularly in FIGURES 1, 2 and 3. The rod 50 extends through bore 51 formed in slider member 46.

The slider member 46 is formed with a bore 54 that slidably receives the rear portion of a steering rod 60. The front end of the steering rod 60 is pivotally connected to the fifth wheel unit 18 of the tractor 10 at a point spaced to one side of the center thereof. With this arrangement, steering action of the tractor 10 relative to the trailer 12 will cause the steering rod 60 to undergo longitudinal movement relative to the trailer frame 20, as indicated particularly in FIGURE 4.

The slider member 46 is provided with a fluid-actuated, vertical cylinder and plunger unit 62, the cylinder 62a of such unit being rigidly secured to the upper leg of a generally U-shaped mount 64 that extends upwardly from the slider member. The unit 62 is actuated by air lines 65 by conventional controls (not shown) located in the cab of the tractor 10. The lower end of plunger 62b of the cylinder and plunger power unit 62 is rigidly affixed to a lock element, generally designated 66. The lock element 66 includes a horizontal leg 68, the inner end of which is integral with an upwardly extending pointed dog 70. The outer end of the element 68 is integral with a downwardly extending pointed dog 72. The inner dog 70 is movable into the confines of a complementary pocket 74 formed in the aforementioned support rod 50 upon upward movement of plunger 62b. Similarly, the lower end of dog 72 is movable downwardly into the confines of a complementary pocket 76 formed in the steering rod 60 upon downward movement of the plunger 62b.

It will be apparent that when dog 70 is inserted within pocket 74 slider member 46 will be locked against relative longitudinal movement with respect to support rod 50.

Simultaneously, the dog 72 will be raised free of the pocket 76 whereby slider member 46 and steering rod 60 will be free to undergo relative longitudinal movement. At this time member 36 is locked to rod 50 by dog 70. When the dog 72 is lowered with the confines of pocket 76, slider member 46 will be locked against relative longitudinal movement with respect to steering rod 60. At this time dog 70 will be free of pocket 74 whereby slider member 46 will be free to undergo longitudinal movement relative to support rod 50.

In the operation of the aforedescribed apparatus, during forward movement of the tractor-trailer, it is desired to have the trailer wheels 22 automatically track the tractor 10 as the tractor is steered around a curve. To obtain such automatic steering the plunger 62b of the power unit 62 will be extended downwardly into the position shown in FIGURE 3. In this position, the outer dog 72 will be disposed within the pocket 76 so as to lock the slider member 46 to the steering rod 60. Accordingly, longitudinal movement of the steering rod 60 as the tractor 10 is steered will be concurrently transferred to the slider member 46 and hence to the rod 44. Longitudinal movement of the rod 44 will effect sliding movement of the block 40 relative to the support 42. Such movement of the block 40 will in turn be transferred to the axles 24 and 26 by the aforedescribed tie rod means 32, 34, 36 and 38. Accordingly, as indicated in FIGURE 4, the trailer wheels 22 will automatically track the front wheels of the tractor 10. It should be noted that trailer wheels 22 will not drag or skid across the road pavement during such tracking because of the pivotal mounting of axles 24 and 26.

When it is desired to back the trailer 12 into a confined space, the plunger 62b of the power unit 62 will be raised into the position shown in FIGURE 7. In this position the inner dog 70 will be disposed within the pocket 74 of support rod 50 so as to lock the slider member 46 to this support rod and hence against longitudinal movement relative to trailer frame 20. At this time, the outer dog 72 will be raised from within the confines of pocket 76 whereby longitudinal movement of the steering rod 60 will not be transferred to the slider member 46. Accordingly, the axles 24 and 26, and hence the trailer wheels 22, will be locked in their longitudinally extending position shown in FIGURE 6 by means of rod 44, block 40 and the tie rod means 32, 34, 36 and 38. Thus, as indicated in FIGURE 6, the trailer 12 may be jacknifed relative to the tractor 10 during reverse movement of the trailer-tractor unit.

It should be particularly noted that although the slider member lock means shown and described herein takes the form of an air-operated cylinder and plunger device, various other types of lock means could be employed. By way of example, the power unit 62 could be hydraulically actuated. Alternatively, a suitable electrically-actuated or mechanically-operated lock means could be provided.

Various other modifications and changes may be made with respect to the foregoing detailed description without departing from the spirit of the present invention or the scope of the following claims.

I claim:

1. In a tractor-trailer wherein said tractor includes a fifth wheel, the combination of:
   a trailer frame connected at its front portion to said fifth wheel;
   ground-engaging wheels;
   right and left axle means for said ground-engaging wheels pivotally supported by the rear portion of said trailer frame whereby said wheels may be steered;
   tie rod means connecting said right and left axle means for concurrent pivotal movement about a vertical axis;
   a slider member supported on said trailer frame for longitudinal movement therealong;
   a force-transfer element interposed between said tie rod means and said slider member whereby longitudinal movement of said slider member will effect concurrent pivotal movement of said axle means;
   a steering rod having its rear portion slidably connected to said slider member and its front end pivotally connected to said fifth wheel of said tractor whereby said rod undergoes longitudinal movement relative to said trailer frame when said tractor is steered out of alignment with said trailer;
   and lock means operatively interposed between said trailer frame and said steering rod and slider member, said lock means being actuable to lock said slider member to said steering rod while permitting said slider member to move longitudinally relative to said frame to thereby effect concurrent movement of said steering rod, slider member and force-transfer member whereby said trailer wheels will be steered in the opposite direction as the front wheels of said tractor, and said lock means being alternatively actuable to secure said slider member against movement relative to said trailer frame while disconnecting said steering rod from said slider member whereby said trailer wheels will be locked in a longitudinally extending position relative to said trailer.

2. A tractor-trailer as set forth in claim 1 wherein said lock means is fluid-actuated.

3. A tractor-trailer as set forth in claim 1 wherein said tie rod means include a block supported for diagonal sliding movement on said trailer frame between said axle means and a pair of tie rod elements pivotally interconnecting said block and said axle means whereby sliding movement of said block will effect steering of said axle means, with said block being pivotally connected to the rear end of said force-transfer element.

4. A tractor-trailer as set forth in claim 3 wherein said lock means is fluid-actuated.

5. In a tractor-trailer wherein said tractor includes a fifth wheel, the combination of:
   a trailer frame connected at its front portion to said fifth wheel;
   ground-engaging wheels;
   transverse right and left axles for said ground-engaging wheels pivotally supported at their ends by the rear of said trailer frame for movement about a vertical axis whereby said trailer wheels may be steered;
   a pair of longitudinal tie rods secured to the inner ends of said axles;
   a transverse tie rod having its opposite ends pivotally connected to the free ends of said pair of tie rods;
   a block supported for diagonal sliding movement on said trailer frame between said axles;
   a slider member supported on said trailer frame for longitudinal movement therealong;
   a connector rod pivotally connecting said block and one of said longitudinal tie rods;
   a force-transfer rod interposed between said block and said slider member whereby longitudinal movement of said slider member will effect concurrent pivotal movement of said axle means;
   a steering rod having its rear portion slidably connected to said slider member and its front end pivotally connected to said fifth wheel of said tractor whereby said rod undergoes longitudinal movement relative to said trailer frame when said tractor is steered out of alignment with said trailer;
   and lock means operatively interposed between said trailer frame and said steering rod and slider member, said lock means being actuable to lock said slider member to said steering rod while permitting said slider member to move longitudinally relative to said frame to thereby effect concurrent movement of said steering rod, slider member and force-transfer rod whereby said trailer wheels will be steered in the opposite direction as the front wheels of said tractor, and said lock means being alternatively actuable to secure said slider member against movement relative to said trailer frame while disconnecting said steering rod from said slider member whereby said trailer wheels will be locked in a longitudinally extending position relative to said trailer.

6. A tractor-trailer as set forth in claim 5 wherein said lock means is fluid-actuated.

References Cited

UNITED STATES PATENTS

| | | | |
|---|---|---|---|
| 2,069,928 | 2/1937 | Runyan | 280—426 |
| 2,389,752 | 11/1945 | Avery | 280—426 |
| 2,785,909 | 3/1957 | Barnard | 280—426 |
| 2,793,052 | 5/1957 | Googe | 280—426 |

LEO FRIAGLIA, *Primary Examiner.*